No. 618,047. Patented Jan. 24, 1899.
E. G. ALLEN.
STREET RAILWAY CAR.
(Application filed Mar. 17, 1898.)
(No Model.)
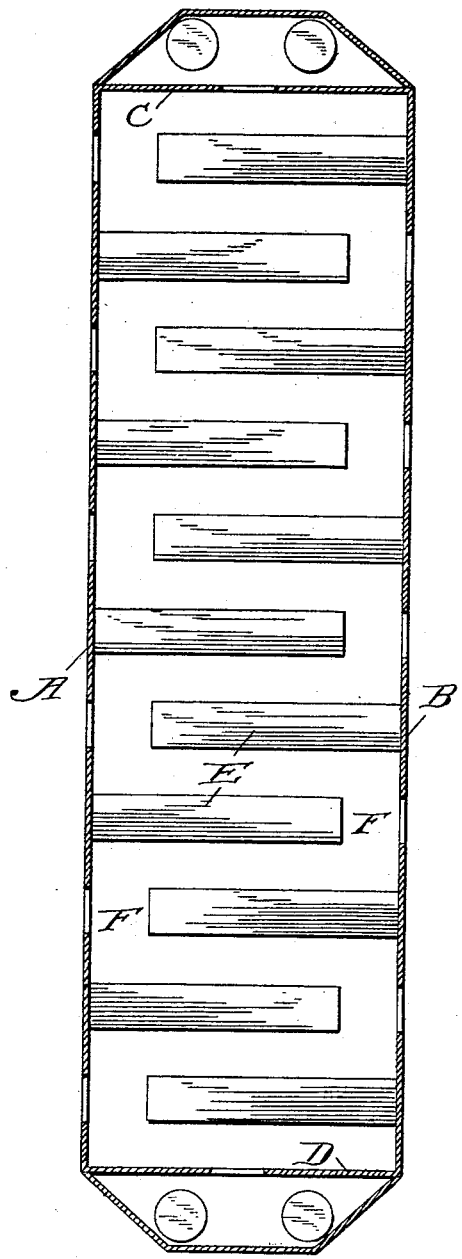
Attest
Walter Donaldson
C. S. Middleton
Inventor
E. Elbridge G. Allen
by Ellis Spear
Atty.

UNITED STATES PATENT OFFICE.

ELBRIDGE GERRY ALLEN, OF BOSTON, MASSACHUSETTS.

STREET-RAILWAY CAR.

SPECIFICATION forming part of Letters Patent No. 618,047, dated January 24, 1899.

Application filed March 17, 1898. Serial No. 674,215. (No model.)

*To all whom it may concern:*

Be it known that I, ELBRIDGE GERRY ALLEN, a citizen of the United States, residing at Boston, county of Suffolk, and State of Massachusetts, have invented certain new and useful Improvements in Street-Railway Cars, of which the following is a specification.

My invention relates to railway-cars, and while especially adapted for street-cars and cars used on suburban railways, such as the ordinary trolley-car, may be used in other situations, as in steam-railway cars.

It is the object of the present invention to enlarge the seating capacity of the car, while at the same time provide for the passage of the conductor from end to end of the car and render unnecessary the running-board commonly used on summer-cars or the center aisle used in winter-cars, which takes up such a great amount of space and materially diminishes the seating capacity. I have aimed to make such an arrangement of the seats as to leave a passage between the seat at one end and the wall of the car just sufficient to allow the conductor to pass, and in the ordinary width of car a seat can be made of sufficient length to leave such passage and to provide seats for five persons. Where a center aisle is used, with short seats upon either side extending laterally, these seats will hold but two people each; but by providing a passage at the end of the seats five people can be comfortably seated and still sufficient space left between the end of the seat and the car-wall for the conductor to pass from one seat to the other in rear thereof. In order to properly balance the car, I arrange the seats in alternation, the passage for the conductor being at one end at one seat and at the opposite end at the next seat, and so on, and this also aids in the easy egress and ingress of the passengers to the seats.

In the accompanying drawing I have shown my invention in plan view as applied to a car of ordinary dimensions.

It will be understood that the illustration is only diagrammatic, and I do not limit myself to its application to any particular kind of a car, as the invention in the present case relates wholly to the arrangement of the seats, and it may be applied to any form of car where found desirable.

It is well known that running-boards are very objectionable by reason of the liability to accident, and their only advantage is in enabling the car to be arranged with seats extending entirely across from one wall to the other, while the other form of car, having a center aisle and laterally-extended seats, materially diminishes the capacity of the car and only permits the seating of four persons to the width of the car. While but two persons can occupy one of the short seats, the space is a little greater than is necessary to seat two persons comfortably, while the center aisle is wider than is necessary; but it is not possible to narrow the aisle sufficiently to gain a seat upon one side or the other. I have overcome this difficulty, however, by arranging a passage-way at the end of the seat and between it and the wall of the car, and I thus am enabled to take advantage of all the extra space in the long seat. I find that this is sufficient to comfortably seat a fifth person, as the aisle at the end of the seat may be of minimum width.

As shown in the drawing, I have indicated the car-walls at A B and the end walls at C D. The seats are shown at E, with the passage-way F at the end. In order to properly balance the car, the seats are arranged alternately, and side openings are provided which may have doors or curtains, as may be found necessary or desirable.

What I claim is—

In a railway-car, a series of seats extending laterally of the length of the car with a passage at one end of each seat, the seats being arranged alternately, substantially as described.

In testimony whereof I affix my signature in presence of two witnesses.

ELBRIDGE GERRY ALLEN.

Witnesses:
ALBERT W. MARTIN,
GEORGE A. SNOW.